United States Patent [19]
Yamada et al.

[11] 3,957,947
[45] May 18, 1976

[54] PROCESS FOR CONTINUOUS PRODUCTION OF AQUEOUS BASIC ALUMINUM SALT SOLUTIONS

[75] Inventors: Koichi Yamada; Masao Yoshihara; Hisakatsu Kato, all of Niihama, Japan

[73] Assignee: Sumitomo Chemical Company, Limited, Osaka, Japan

[22] Filed: Feb. 25, 1974

[21] Appl. No.: 445,605

[30] Foreign Application Priority Data
Feb. 26, 1973  Japan.................................. 48-23523
Feb. 26, 1973  Japan.................................. 48-23524

[52] U.S. Cl................................. 423/111; 423/395; 423/462; 423/495
[51] Int. Cl.²....................... C01F 7/00; C01F 7/56; C01F 7/66
[58] Field of Search............ 423/111, 462, 495, 395

[56] References Cited
UNITED STATES PATENTS

| | | |
|---|---|---|
| 2,196,016 | 4/1940 | Huehn et al........................ 423/495 |
| 2,931,706 | 4/1960 | Gresky et al........................ 423/395 |
| 3,544,476 | 12/1970 | Aiba et al........................ 423/495 X |
| 3,655,329 | 4/1972 | Shih et al........................... 423/395 |

FOREIGN PATENTS OR APPLICATIONS

| | | | |
|---|---|---|---|
| 36-24055 | 12/1961 | Japan................................ 423/462 |
| 43-5647 | 3/1968 | Japan................................ 423/395 |

*Primary Examiner*—Edward Stern
*Attorney, Agent, or Firm*—Stevens, Davis, Miller & Mosher

[57] ABSTRACT

An aqueous basic aluminum salt high in basicity can be continuously produced with a high conversion by passing a slurry of aluminum hydroxide, alumina-containing mineral or a mixture thereof and hydrochloric or nitric acid through a tubular reactor and then reacting the initial stage reaction product with the unreacted alumina in a holding treatment portion provided subsequent to the tubular reactor.

12 Claims, 1 Drawing Figure

U.S. Patent  May 18, 1976  3,957,947
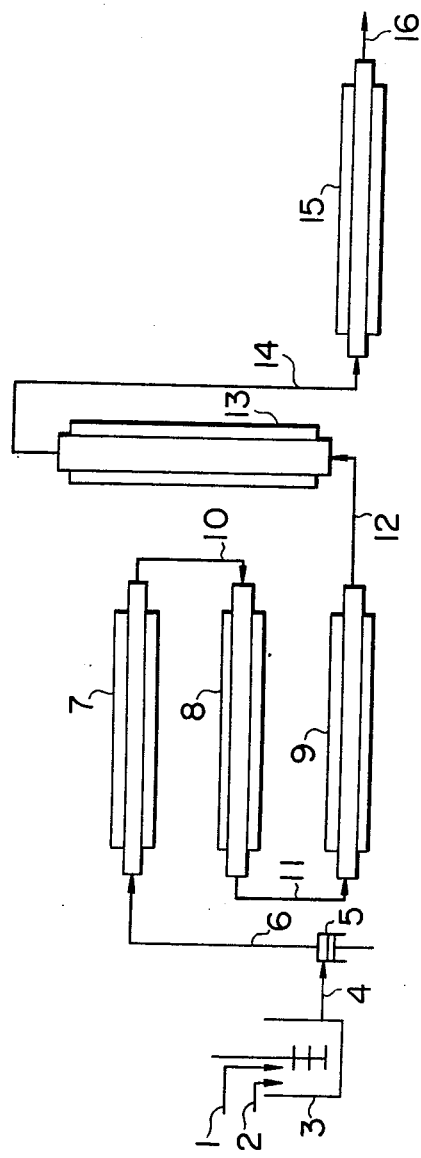

PROCESS FOR CONTINUOUS PRODUCTION OF AQUEOUS BASIC ALUMINUM SALT SOLUTIONS

This invention relates to a process for the continuous production of an aqueous basic aluminum salt solution. More particularly, the invention is concerned with a process for continuously producing an aqueous basic aluminum salt solution from aluminum hydroxide, alumina-containing mineral or a mixture thereof (hereinafter referred to as "alumina"), particularly aluminum hydroxide obtained according to the Bayer process, and hydrochloric or nitric acid (hereinafter referred to as "mineral acid").

Basic aluminum salts, which are represented by the general formula $$Al_n(OH)_m X_{3n-m}$$

wherein X represents an acid group of Cl or $NO_3$; 3n is greater than m; and the chemical equivalent ratio of Al to X, i.e., 3n/3n-m, is within the range from about 1.2 to about 6, are useful as coagulants for the clarification of waste water, impregnants, adhesives, sweat-controlling agents, etc., and the demand therefor has rapidly increased in recent years.

Heretofore, an aqueous basic aluminum salt solution has been produced according to such a batchwise process that alumina and mineral acid are reacted by being heated in a glass-lined autoclave. Generally, however, alumina is low in reactivity with mineral acid, so that a high temperature of more than 120°C is ordinarily required for the reaction of them. According to the conventional process in which the glass-lined autoclave is used as the reactor, there are brought about many such drawbacks that the reaction is controlled by the heat transfer, and such an extremely long period of time as about 0.5 to 20 hours is ordinarily required for termination of the reaction, and that the glass-lined autoclave is difficultly provided with an inlet for the starting material and an exit for the reaction product to make it impossible to carry out the reaction in a continuous manner. Furthermore, the conventional process is undesirably high in equipment cost since the glass liner of a large-sized autoclave is quite costly.

According to a process in which a basic aluminum salt is continuously produced by feeding alumina and mineral acid to a tubular reactor, there are such disadvantages that the rate of reaction of alumina with aluminum chloride or aluminum nitrate, which is an initial stage reaction product for producing the basic aluminum salt, is extremely low and therefore a long tubular reactor is required to increase the basicity of the product.

With an aim to establish a process for continuously producing an aqueous basic aluminum salt solution high in basicity by use of a short tubular reactor, the present inventors made extensive studies to find that a part of the reaction of alumina with aluminum chloride or aluminum nitrate, which is an initial stage reaction product, is carried out at such a flow rate that the alumina, which has been made smaller in grain size due to the reaction, is not precipitated but is suspended to a maximum extent, i.e. at a flow rate which not only is lower than the flow rate at the feeding portion of the tubular reactor but also does not allow the alumina to precipitate, whereby an aqueous basic aluminum salt solution high in basicity can be obtained with a high conversion by use of a shorter tubular reactor. Based on the above finding, the inventors have accomplished the present invention.

An object of the present invention is to provide a process for continuously producing an aqueous basic aluminum salt solution by use of a shortened tubular reactor.

Other objects and advantages of the present invention will become apparent from the description given below.

In accordance with the present invention, there is provided a process for continuously producing an aqueous basic aluminum salt solution high in basicity with a high conversion by use of a shortened tubular reactor which comprises passing a slurry of aluminum hydroxide, alumina-containing mineral or a mixture thereof and hydrochloric or nitric acid through a tubular reactor heated indirectly to at least the boiling point of the aqueous basic aluminum salt solution at such a flow rate that the slurry is not precipitated, characterized in that a holding treatment portion is provided subsequent to the tubular reactor.

The present process is explained in detail below.

The alumina used as a starting material in the present process is, for example, aluminum hydroxide, bauxite, alum or clay. Particularly, aluminum hydroxide obtained according to the Bayer process is preferably used. The aluminum hydroxide obtained according to the Bayer process has an average grain size of less than 150 microns, in general, and may be used either as it is or in the form of finer grains. The bauxite, clay or the like is preferably used in the form of grains of less than 150 microns in size.

As the starting mineral acid, there is used hydrochloric acid or nitric acid. The hydrochloric acid to be used in the present process should have a hydrochloric acid concentration of at least about 10 % by weight, preferably 20 to 35 % by weight, while the nitric acid should have a nitric acid concentration of at least 20 % by weight, preferably 50 to 100 % by weight. If the mineral acid concentration is less than that mentioned above, the reaction rate is undesirably lowered.

The proportions of alumina and mineral acid are such that in the case of aluminum hydroxide, the amount of mineral acid is in the range from 1 to 5 moles per mole of $Al_2O_3$, while in the case of alumina-containing mineral, the amount of mineral acid is in the range from 1 to 5 moles per mole of $Al_2O_3 + Fe_2O_3$, in general.

A slurry of alumina and mineral acid, either as it is or after forming aluminum chloride or aluminum nitrate at a temperature from normal temperature to the boiling point of the resulting aqueous basic aluminum salt solution (preliminary reaction), is fed to a tubular reactor. The preliminary reaction is ordinarily carried out by maintaining the slurry at a temperature in the range from normal temperature to the boiling point of the resulting aqueous basic aluminum salt solution for at least 1 minute, preferably for 10 minutes to 30 hours. If the reaction temperature is lower than normal temperature, the reaction rate becomes low, while if the reaction temperature is higher than the boiling point of the aqueous basic aluminum salt solution, the preliminary reaction vessel is required to be pressure resistant and hence becomes costly, though the reaction can, of course, be effected at above the said temperature.

As the preliminary reaction vessel, a glass-lined or rubber-lined tank equipped with a stirrer is ordinarily used. Alternatively, a closed-type, rubber-lined tank or glass-lined autoclave may also be used.

The resulting preliminary reaction product slurry having a mineral acid concentration of less than about 20 % by weight in the case of hydrochloric acid, and less than about 50 % by weight in the case of nitric acid, is then passed, either as it is or after incorporation of fresh alumina, through a tubular reactor heated indirectly to above 120°C to give a basic aluminum salt.

The concentration of solids in the slurry fed to the tubular reactor varies depending on the mineral acid concentration, etc., but is desirably controlled to 5 to 60 % by weight, preferably 10 to 50 % by weight. If the solid concentration is less than 5 % by weight, the productivity per unit reactor volume is lowered, while if the solid concentration is more than 60 % by weight, the slurry is difficultly passed through the tubular reactor and many such troubles as clogging of the tubular reactor are undesirably brought about.

The slurry of alumina and mineral acid or the preliminary reaction product slurry is passed through the tubular reactor at such a flow rate as not to precipitate the solids in the slurry, i.e. at a flow rate of at least 0.1 cm/sec., preferably 0.5 to 400 cm/sec.

In the present invention, a tubular reactor is used for the synthesis of basic aluminum salt, so that the heat transfer area can be made several to several ten times larger than in the case where a conventional autoclave is used, and the reaction time can be greatly shortened.

The temperature of the tubular reactor is at least about 120°C, i.e. the boiling point of the resulting basic aluminum salt solution, preferably from 150° to 220°C. If the maximum temperature of the tubular reactor is lower than 120°C, a long period of time is required for the reaction, with the result that a longer tubular reactor should necessarily be used.

The residence time of the slurry in the tubular reactor varies according to the molar ratio of mineral acid to alumina and the maximum temperature of the reactor. However, when the molar ratio of mineral acid to alumina is 3 : 1, for example, about 80 % by weight of the alumina can be dissolved in 2 to 3 hours at 120°C, in 1 hour at 140°C, in 20 minutes at 160°C, and in 10 minutes at 180°C, and about 95 % by weight of the alumina can be dissolved in 4 hours at 140°C, in 1 hour at 160°C, in 15 minutes at 180°C, and in several minutes at 200°C. The residence time is decided according to the desired dissolution ratio of the starting alumina.

The length of the tubular reactor is limited to a length capable of providing a residence time sufficient for the alumina to reach a desired conversion, and is ordinarily from 5 m to 500 m. The diameter of the tubular reactor is not particularly limited but is from 5 to 400 mm, in general.

The slurry of the thus synthesized basic aluminum salt low in basicity containing unreacted alumina is then sent to the holding treatment portion, which is a characteristic of the present invention, and the undissolved alumina is further dissolved within said portion to give a basic aluminum salt high in basicity.

In practicing the present invention, the holding treatment portion is provided subsequent to the tubular reactor, which is a main basic aluminum salt-forming step. The holding treatment portion is provided in order to react the initial stage reaction product, i.e. aluminum chloride or aluminum nitrate, or the low basicity aluminum salt with the unreacted alumina at such a flow rate that the alumina, which has been made smaller in grain size due to reaction in the aforesaid tubular reactor, is not precipitated but remains suspended to a maximum extent, i.e. at a flow rate which not only is lower than the flow rate at the feeding portion of the tubular reactor but also does not allow the alumina to precipitate. Such holding treatment portion may be provided by attaching to the end of the aforesaid tubular reactor a pipe, autoclave or other vessel having an inner diameter larger than the diameter of the tubular reactor, or by making the latter-half portion of the tubular reactor larger in diameter than the before-half portion thereof.

The temperature of the holding treatment portion is at least about 120°C, i.e. the boiling point of the resulting aqueous basic aluminum salt solution, preferably from 150° to 220°C. If the temperature of said portion is lower than the boiling point of the aqueous basic aluminum salt solution, there are brought about such disadvantages that an extremely long period of time is required for the dissolution of the alumina, the basicity of the resulting basic aluminum salt cannot be made higher, and the yield based on the amount of the starting alumina is lowered. On the other hand, if the temperature of said portion is higher than 220°C, the operation pressure becomes excessively high to result in economical disadvantages.

The residence time of the slurry in the holding treatment portion varies according to the temperature, the amount of alumina, etc. Generally, however, the slurry is maintained in said portion until at least 95 % of the starting alumina is dissolved.

When the holding treatment portion according to the present invention is provided, the reaction can be conducted by use of a tubular reactor which is far shorter in length than a tubular reactor identical in diameter with the said reactor.

The material of the tubular reactor or holding treatment portion may be any material so far as it is acid resistant. Examples of such material are tantalum-lined pipe, stainless steel pipe, acid resistant resin-lined pipe, acid resistant ceramic-lined pipe and glass-lined steel pipe. For economical reason, however, the glass-lined steel pipe is preferably used.

For better understanding, the process of the present invention is explained in detail below with reference to the accompanying drawing, which is a flow sheet of the present process.

In the drawing, alumina and mineral acid are fed through ducts 1 and 2, respectively, to a preliminary reaction vessel 3, i.e. a rubber-lined tank equipped with a stirrer. The resulting slurry is heated in the tank to a temperature of about 25° to 100°C and subjected to preliminary reaction in order to lower the concentration of the mineral acid in the slurry (until a concentration of less than about 20 % by weight is reached in the case of hydrochloric acid). The preliminary reaction is not always necessary.

The preliminary reaction product slurry is fed by means of a pump 5 through ducts 4 and 6 to tubular reactors 7, 8 and 9 at such a flow rate that the alumina is not precipitated, ordinarily at a flow rate of at least 0.1 cm/sec.

The tubular reactors 7, 8 and 9 have been connected to each other by means of ducts 10 and 11. While the drawing shows the case where a combination of three tubular reactors is used, it is needless to say that a single tubular reactor or a combination of many tubular reactors may also be used. Each of the tubular reactors 7, 8 and 9 has been covered with a jacket, and has such a construction as to be heated by introducing into the jacket a heating medium such as high pressure vapor, diphenyl ether, liquid organic medium or molten salt, thereby heating the slurry to form a basic aluminum salt.

The drawing shows the case where a double pipe heat exchanger is used as the heating means, but it is of course possible to use other heating means. In case a maximum temperature of at least 180°C is desired to be attained by use of tubular reactors of such a type as shown in the drawing, the exit temperatures of the tubular reactors 7, 8 and 9 may be maintained, in general, at about 100°C, 150°C and 180°C, respectively.

The thus synthesized basic aluminum salt containing undissolved alumina is then sent through a duct 12 to a holding treatment portion 13 to dissolve the undissolved alumina. The holding treatment portion has been heated to or maintained at about or above the maximum temperature of the tubular reactor, and has been so constructed as to provide a lower flow rate than in the tubular reactor. If the flow rate in the holding treatment portion is made one-half the flow rate at the inlet of the tubular reactor, and if a tubular reactor is used in place of the holding reatment portion, the said tubular reactor should be made two times longer than the holding treatment portion. This shows the fact that the effect of the present invention is quite marked. The holding treatment portion has been covered with a jacket, and has such a construction that a heating medium such as high pressure vapor, diphenyl ether, liquid organic heating medium or molten salt is introduced into the jacket to heat the slurry. The heating medium used in the holding treatment portion may be used also for the heating of the tubular reactors.

The basic aluminum salt synthesized in the above-mentioned manner is sent through a duct 14 to a double pipe heat exchange-type cooler 15, indirectly cooled therein with a cooling medium introduced into the jacket, and then taken out through a duct 16 as the product basic aluminum salt. Although the drawing shows the case where monotubular reactors are used as the tubular reactors, multitubular reactors may also be used. Further, the cooling may also be effected by use of a multitubular cooler. The heating or cooling may be carried out, without using a double pipe heat exchanger, by adoption of any procedure so far as the slurry flowing inside the pipe can indirectly be heated according to the said procedure. Particularly, the cooling is desirably conducted by use of a cooling medium capable of being cooled by the self-vaporization so that the recovered heat can be reused in the reaction. Further, Rasching rings or the like fillers may be packed in the tubular reactors in order to increase the heat transfer rate and the reaction rate.

In case aluminum hydroxide is used as the starting alumina, it is possible to make the product basic aluminum salt free from undissolved matters. In case bauxite or the like is used, however, the product contains undissolved matters. In such case, the product may be subjected to solid-liquid separation by filtration or the like.

The thus obtained basic aluminum salt may be used as it is or, if necessary, after being increased in alumina concentration and basicity by mixing with aluminum sulfate or a basic aluminum salt prepared according to other process.

According to the present process detailed in the above, an aqueous basic aluminum salt solution, which has heretofore been produced only in a batchwise manner, can be produced in a continuous manner.

According to the prior art process using an autoclave, the reaction takes such a long period of time as about 5 to 20 hours, whereas according to the present process, the reaction can be terminated in 10 minutes to 2 hours, in general, and thus the reaction time can be greatly shortened.

The tubular reactors used in the present process are extremely short in length, and hence have such advantages as being easy not only in maintenance but also in construction. Furthermore, the present process can be carried out by use of extremely small-sized tubular reactors, and thus brings about many economical and industrial advantages.

The process of the present invention is illustrated in detail below with reference to an example, but the invention is by no means limited to the example.

Example

In such reaction apparatus as shown in the accompanying drawing a vessel having an inner volume of 7 liters was used as the preliminary reaction vessel 3; glass-lined, double pipe heat exchange-type tubular reactors of 20 mm in inner diameter and 2.1 m in length were used as the tubular reactors 7, 8 and 9; and a glass-lined pipe of 150 mm in inner diameter and 80 cm in length which had been heat-insulated with an insulator was used as the holding treatment device 13. The preliminary reaction vessel 3 was heated to 80°C, the tubular reactors 7, 8 and 9 were heated so as to have exit temperatures of 100°C, 150°C, and 180°C, respectively, and the interior of the holding treatment device was maintained at 180°C. Further, a double pipe heat exchange-type cooler of 20 mm in inner diameter and 6 m in length was used as the cooler 15 so as to control to 70°C the temperature of the aqueous basic aluminum salt solution withdrawn through the duct 16.

A slurry having a hydrochloric acid concentration of 35 % by weight and containing 31.8 % by weight of an alumina trihydrate (average grain size 60 $\mu$) obtained according to the Bayer process was subjected to preliminary reaction for 10 minutes in the preliminary reaction vessel 3 to lower the hydrochloric acid concentration to 7 % by weight and to decrease the average grain size of the alumina trihydrate to 10 $\mu$. By means of the pump 5, the slurry was then flowed at a rate of 3.6 cm/sec. through the ducts 4 and 6 into the tubular reactors. The slurry having a temperature of 180°C and containing a small amount of undissolved alumina trihydrate which had been led from the tubular reactor 9 was sent through the duct 12 to the holding treatment device 13 and maintained therein for 20 minutes at a flow rate of 0.06 cm/sec. In the above manner, the reaction was carried out continuously. The resulting aqueous basic aluminum chloride solution withdrawn through the duct 16 had a basicity (in terms of m/3n) of 46.1 % and an aluminum hydroxide dissolution ratio of 99.5 %. The pressure inside the tubular reactors was 8 kg/cm$^2$.

For comparison, entirely the same treatments as above were carried out, except that the holding treatment device 13 was not provided. The resulting aqueous basic aluminum chloride solution withdrawn through the duct 16 had a basicity of 43.9 % and an aluminum hydroxide dissolution ratio of 95.5 %.

From the above results, it is understood that when the holding treatment step is adopted, the resulting aqueous basic aluminum chloride solution can be increased in basicity and in aluminum hydroxide dissolution ratio.

In case an aqueous basic aluminum chloride solution having a basicity of more than 46.1 % is desired to be obtained by using, in place of the holding treatment device 13, a reaction tube identical in inner diameter with the tubular reactors 7 to 9, the reaction tube used in place of the holding treatment device should have a length of more than 40 m and thus an extremely long reaction tube is required to be used.

What is claimed is:

1. A process for continuously producing a basic aluminum salt comprising
    passing (A) a slurry consisting of (1) an alumina selected from the group consisting of aluminum hydroxide, an alumina-containing mineral and a mixture thereof, and (2) a mineral acid selected from the group consisting of hydrochloric acid and nitric acid, or (B) a slurry resulting from the preliminary reaction of said slurry at a temperature of from normal temperature to the boiling point of an aqueous basic aluminum salt solution, through an indirectly heated tubular reactor maintained at a temperature of at least about 120°C at a flow rate such that solid material in the slurry is not settled, and then
    passing the slurry of basic aluminum salt of low basicity synthesized in the tubular reactor, said slurry containing unreacted alumina particles, through a holding treatment device having a larger inner diameter than said tubular reactor, the holding treatment device being indirectly heated and maintained at a temperature above the boiling point of the aqueous basic aluminum salt solution, at a flow rate lower than the flow rate at the feeding part of said tubular reactor and near the suspension limit rate to prevent unreacted alumina particles in the slurry from settling, thereby additionally dissolving the unreacted alumina contained in the slurry and obtaining a basic aluminum salt of a basicity higher than that of the salt obtained from said tubular reactor.

2. A process according to claim 1, wherein said aluminum hydroxide is that obtained by the Bayer process.

3. A process according to claim 1, wherein concentration of hydrochloric acid is at least 10 % by weight.

4. A process according to claim 3, wherein concentration of hydrochloric acid is 20 to 35 % by weight.

5. A process according to claim 1, wherein concentration of nitric acid is at least 20 % by weight.

6. A process according to claim 5, wherein concentration of nitric acid is 50 to 100 % by weight.

7. A process according to claim 1, wherein the ratio of the mineral acid and aluminum hydroxide is 1–5 mols of the former per mol of the latter.

8. A process according to claim 1, wherein the ratio of the mineral acid and alumina-containing mineral is 1–5 mols per mol of $Al_2O_3 + Fe_2O_3$.

9. A process according to claim 1, wherein concentration of solid in the slurry is 5 to 60 % by weight.

10. A process according to claim 1, wherein the slurry is fed to the tubular reactor at a flow rate of at least 0.1 cm/sec.

11. A process according to claim 1, wherein the holding treatment portion is maintained at 150° – 220°C.

12. A process according to claim 1, wherein the slurry is fed to the tubular reactor at a flow rate of 0.5 to 400 cm/sec.

* * * * *